US012572655B2

(12) United States Patent
　　Pletka et al.

(10) Patent No.:　US 12,572,655 B2
(45) Date of Patent:　　Mar. 10, 2026

(54) DETECTING RANSOMWARE ACTIVITY IN DATA STORAGE SYSTEMS

(71) Applicant: International Business Machines Corporation, Armonk, NY (US)

(72) Inventors: Roman Alexander Pletka, Uster (CH); Slavisa Sarafijanovic, Adliswil (CH); Dionysios Diamantopoulos, Zurich (CH); Charalampos Pozidis, Thalwil (CH); Yves Alexandre Beraldo Dos Santos, Houston, TX (US); Andrew D. Walls, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 71 days.

(21) Appl. No.: 18/599,003

(22) Filed: Mar. 7, 2024

(65) Prior Publication Data

US 2025/0284803 A1　　Sep. 11, 2025

(51) Int. Cl.
　　*G06F 21/56*　　　　(2013.01)
　　*H04L 9/40*　　　　　(2022.01)

(52) U.S. Cl.
　　CPC ........ *G06F 21/565* (2013.01); *H04L 63/1416* (2013.01); *H04L 63/1491* (2013.01)

(58) Field of Classification Search
　　CPC ................... H04L 63/12; H04L 63/123; H04L 63/14–1425; H04L 63/1491; G06F 21/88
　　See application file for complete search history.

(56) References Cited

U.S. PATENT DOCUMENTS

| | | | |
|---|---|---|---|
| 10,055,582 B1 | 8/2018 | Weaver et al. | |
| 10,121,003 B1 | 11/2018 | Adams | |
| 11,113,156 B2 | 9/2021 | Brewer et al. | |
| 11,663,336 B1 * | 5/2023 | Armangau | G06F 21/60 726/23 |
| 11,748,475 B1 * | 9/2023 | Berk | G06F 21/564 726/22 |
| 12,306,937 B1 * | 5/2025 | Siu | G06F 21/566 |
| 2017/0093886 A1 * | 3/2017 | Ovcharik | H04L 9/002 |
| 2017/0324755 A1 * | 11/2017 | Dekel | G06F 21/60 |
| 2020/0097653 A1 * | 3/2020 | Mehta | G06N 3/045 |
| 2020/0387609 A1 | 12/2020 | Hansen | |

(Continued)

OTHER PUBLICATIONS

Constantinescu et al., "Sentinel—Ransomware Detection in File Storage," Proceedings of the 14th ACM International Conference on Systems and Storage (SYSTOR '21), Jun. 2021, 1 page.

(Continued)

*Primary Examiner* — Boris D Grijalva Lobos
(74) *Attorney, Agent, or Firm* — Zilka-Kotab, P.C.

(57) ABSTRACT

A computer-implemented method, according to one approach, is for detecting ransomware activity in storage systems. The computer-implemented method includes: receiving a write request having a plurality of sectors, and each of the sectors further includes a number of sub-sectors. A degree of randomness is determined across the sub-sectors of each of the respective sectors, and a determination is made as to whether any deviations exist in the degrees of randomness. In response to determining a deviation exists in the degrees of randomness, this information on the deviation is used as an indicator of the write request including ransomware activity.

17 Claims, 6 Drawing Sheets

304

From operation
302

350 — Inspect data stored in memory at locations referenced by the sub-sections of the received write request 352 — Initiate the received write request 354 — Evaluate new data that has been received in correlation with the write request and stored in a write cache 356 — Determine an entropy value associated with performing each of the sub-sectors in each of the sectors of the write request 358 — Determine a difference between the entropy values of the sub-sectors in the given sector To operation
306

(56) References Cited

U.S. PATENT DOCUMENTS

| | | | | |
|---|---|---|---|---|
| 2023/0273995 | A1* | 8/2023 | Chen | G06F 21/602 |
| | | | | 726/23 |
| 2024/0134976 | A1* | 4/2024 | Shachar | G06F 16/176 |
| 2024/0333759 | A1* | 10/2024 | Zhang | H04L 63/1416 |
| 2024/0346150 | A1* | 10/2024 | Dar | G06F 21/577 |

OTHER PUBLICATIONS

Lee et al., "Effective Ransomware Detection Using Entropy Estimation of Files for Cloud Services," Sensors, vol. 23, 2023, pp. 1-18.

Davies et al., "Comparison of Entropy Calculation Methods for Ransomware Encrypted File Identification," Entropy, vol. 24, Oct. 21, 2022, pp. 1-24.

Davies et al., "Differential Area Analysis for Ransomware Attack Detection within Mixed File Datasets," arXiv, 2021, pp. 1-13, retrieved from https://arxiv.org/abs/2106.14418.

Hirano et al., Machine Learning Based Ransomware Detection Using Storage Access Patterns Obtained From Live-forensic Hypervisor, IEEE, 2019, 6 pages.

Hirano et al., "RanSAP: An open dataset of ransomware storage access patterns for training machine learning models," Forensic Science International: Digital Investigation, vol. 40, 2022, pp. 1-22.

Gagulic et al., "Ransomware Detection with Machine Learning in Storage Systems," Master Project—Communication Systems, University of Zurich Department of Informatics (IFI), Feb. 13, 2023, 114 pages.

Shafiq et al., "Embedded Malware Detection Using Markov n-Grams", DIMVA 2008, pp. 88-107.

\* cited by examiner

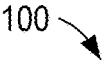
100

COMPUTER  101

PROCESSOR SET 110

PROCESSING CIRCUITRY 120          CACHE 121

COMMUNICATION FABRIC 111

VOLATILE MEMORY 112

PERSISTENT STORAGE 113

OPERATING SYSTEM 122

IMPROVED RANSOMWARE ACTIVITY DETECTION CODE

150

PERIPHERAL DEVICE SET 114

UI DEVICE SET 123          STORAGE 124          IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141          HOST PHYSICAL MACHINE SET 142

VIRTUAL MACHINE SET 143          CONTAINER SET 144

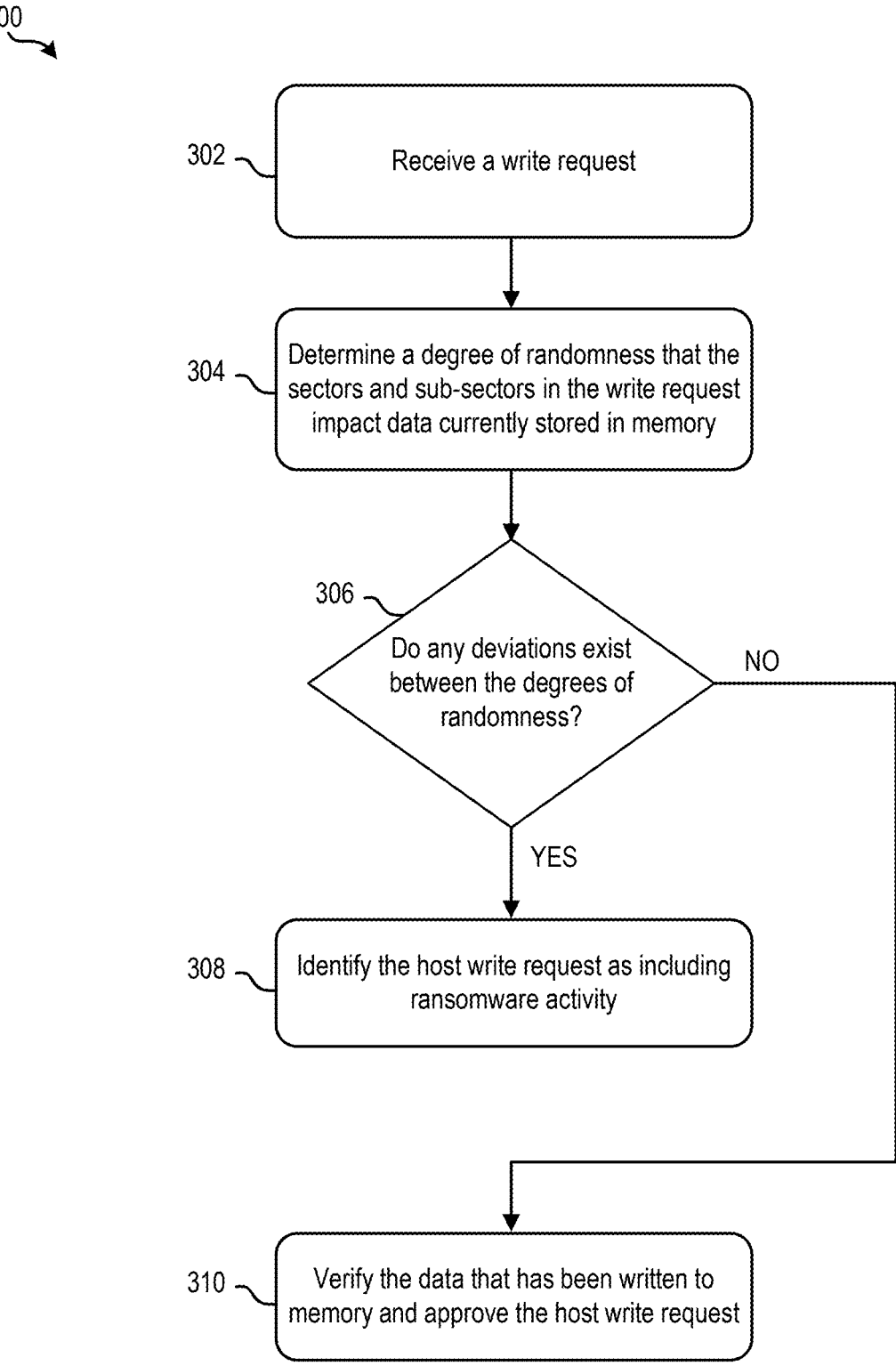

302    Receive a write request

304    Determine a degree of randomness that the sectors and sub-sectors in the write request impact data currently stored in memory 306    Do any deviations exist between the degrees of randomness?

NO

YES

308    Identify the host write request as including ransomware activity

310    Verify the data that has been written to memory and approve the host write request

DETECTING RANSOMWARE ACTIVITY IN DATA STORAGE SYSTEMS

BACKGROUND

The present invention relates to data storage systems, and more specifically, this invention relates to detecting ransomware activity in data storage systems.

The prevalence of computer systems has increased with the advancement of the Internet, and wireless network standards such as Bluetooth and Wi-Fi. Additionally, the adoption and development of smart devices, e.g., such as smartphones, televisions, tablets, and other devices in the Internet of Things (IoT) has increased as processing power and functionality improve.

Moreover, an increasing amount of physical material has been digitized. While this digital conversion improves data storage and data accessibility, it also increases the importance of maintaining cybersecurity (e.g., computer security). Cybersecurity involves the protection of computer systems and networks from attacks by malicious actors. Depending on the type(s) of computer systems and/or networks that are affected, a cybersecurity attack may result in unauthorized information disclosure, damage to hardware and/or software, corruption of data, etc.

While some platforms have been developed to protect computer systems and networks from such attacks, threats are consistently evolving. Computer systems and networks thereby face various types of attacks over time. Ransomware is one such type of cybersecurity attack that has been difficult for conventional products to detect and overcome. Accordingly, there exists a need to develop an intelligent system that is able to detect ransomware activity.

SUMMARY

A computer-implemented method (CIM), according to one approach, is for detecting ransomware activity in storage systems. The CIM includes: receiving a write request having a plurality of sectors, and each of the sectors further includes a number of sub-sectors. A degree of randomness is determined across the sub-sectors of each of the respective sectors, and a determination is made as to whether any deviations exist in the degrees of randomness. In response to determining a deviation exists in the degrees of randomness, this information on the deviation is used as an indicator of the write request including ransomware activity.

A computer program product (CPP), according to one approach, is for detecting ransomware activity in storage systems. The CPP includes: a set of one or more computer-readable storage media, and program instructions. The program instructions are collectively stored in the set of one or more storage media, and are for causing a processor set to perform the foregoing CIM.

A computer system (CS), according to yet another approach, includes: a processor set, and a set of one or more computer-readable storage media. The CS also includes program instructions that are collectively stored in the set of one or more storage media, and which are for causing the processor set to perform the foregoing CIM.

Other aspects and implementations of the present invention will become apparent from the following detailed description, which, when taken in conjunction with the drawings, illustrate by way of example the principles of the invention.

BRIEF DESCRIPTION OF THE DRAWINGS

FIG. 1 is a diagram of a computing environment, in accordance with one approach.

FIG. 3A is a flowchart of a method, in accordance with one approach.

DETAILED DESCRIPTION

Figure 2A:
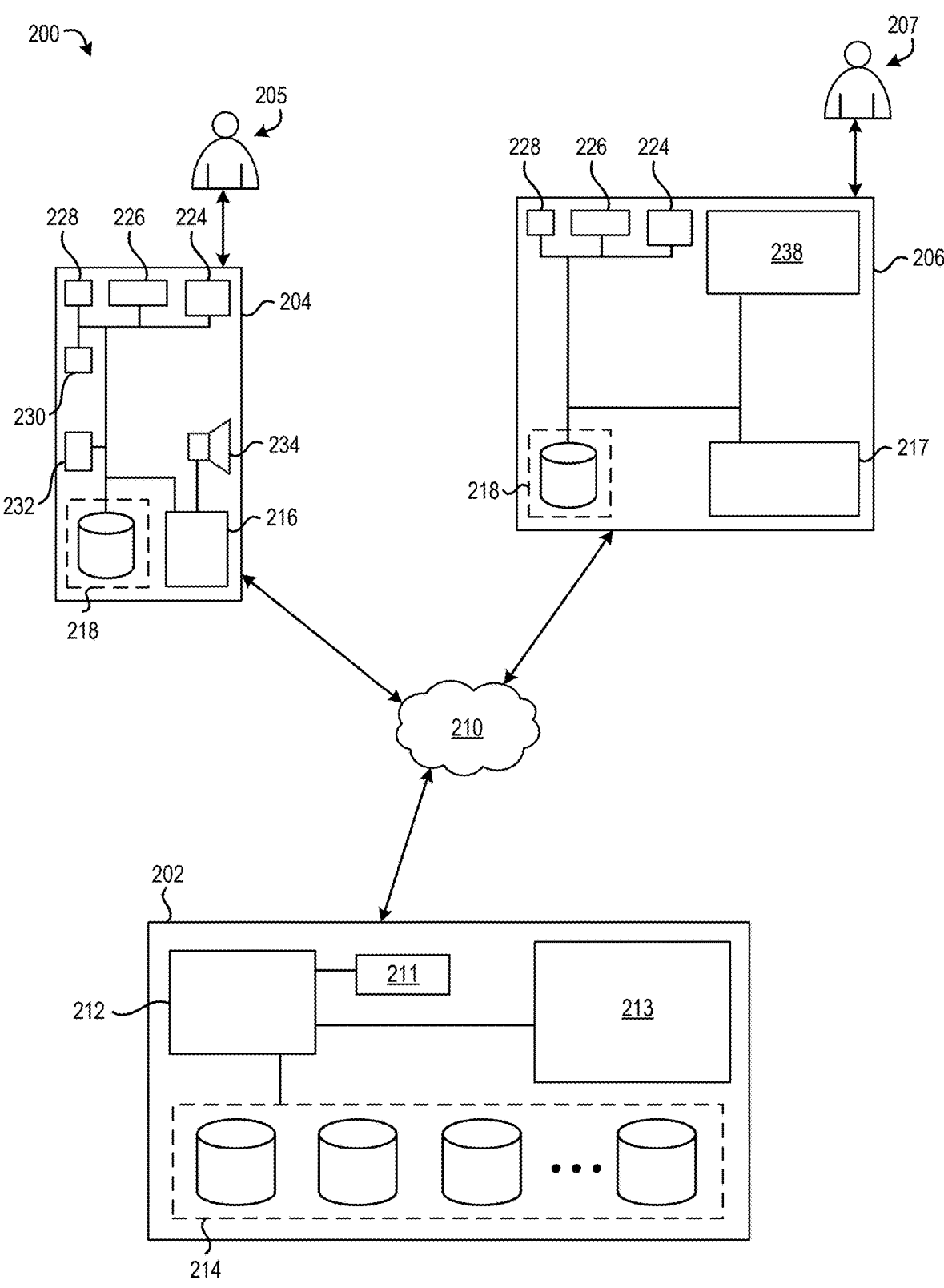
FIG. 2A is a representational view of a distributed system, in accordance with one approach.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred approaches of systems, methods, and computer program products for detecting ransomware activity in storage systems by extracting a degree of randomness from sectors of write requests, and comparing the extracted degrees of randomness to identify deviations among them. The identified deviations represent unnatural shifts in how the data is modified as an outcome of the write requests, thereby indicating ransomware activity, e.g., as will be described in further detail below.

In one general approach, a CIM is for detecting ransomware activity in storage systems. The CIM includes: receiving a write request having a plurality of sectors, and each of the sectors further includes a number of sub-sectors. A degree of randomness is determined across the sub-sectors of each of the respective sectors, and a determination is made as to whether any deviations exist in the degrees of randomness. In response to determining a deviation exists in the degrees of randomness, this information on the deviation is used as an indicator of the write request including ransomware activity.

In another general approach, a CPP is for detecting ransomware activity in storage systems. The CPP includes: a set of one or more computer-readable storage media, and program instructions. The program instructions are collectively stored in the set of one or more storage media, and are for causing a processor set to perform the foregoing CIM.

In yet another general approach, a CS includes: a processor set, and a set of one or more computer-readable storage media. The CS also includes program instructions that are collectively stored in the set of one or more storage media, and which are for causing the processor set to perform the foregoing CIM.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

Computing environment 100 contains an example of an environment for the execution of at least some of the computer code involved in performing the inventive methods, such as improved ransomware activity detection code at block 150 for detecting ransomware activity in storage systems by extracting a degree of randomness from sectors of write requests, and comparing the extracted degrees of randomness to identify deviations among them. The identified deviations represent unnatural shifts in how the data is modified as an outcome of the write requests, thereby indicating ransomware activity, e.g., as will be described in further detail below.

In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and IoT sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network, or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105.

The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICROSERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

In some aspects, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, input/output (I/O) interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various embodiments.

As noted above, the prevalence of computer systems has increased with the advancement of the Internet, and wireless network standards such as Bluetooth and Wi-Fi. Additionally, the adoption and development of smart devices, e.g., such as smartphones, televisions, tablets, and other devices in the IoT has increased as processing power and functionality improve.

Further still, electronic source material has a number of benefits compared to physical documents. For example, electronic documents are easier to store and access in comparison to physical documents. While accessing a physical document involves manually searching each document in a collection until the desired document is found, multiple electronic documents can be automatically compared against one or more keywords. Moreover, electronic documents can be uploaded from and/or downloaded to any device connected to a network, while tangible documents (e.g., papers) must be physically transported between locations. Similarly, electronic documents take up much less space than their physical counterparts.

In view of these benefits, an increasing amount of physical material has been digitized. While this digital conversion improves data storage and data accessibility, it also increases the importance of maintaining cybersecurity (e.g., computer security). Again, cybersecurity involves the protection of computer systems and networks from attacks by malicious actors. Depending on the type(s) of computer systems and/or networks that are affected, a cybersecurity attack may result in unauthorized information disclosure, damage to hardware and/or software, corruption of data, etc. Some platforms have been developed to protect computer systems and networks from such attacks. Some of these platforms are running at the operating system level by monitoring file access patterns and/or process activity resulting in additional overhead on data processing systems. Other platforms observe network traffic activity to detect malicious behavior. Computer systems and networks thereby face various types of attacks over time. As threats are consistently evolving, platforms using a combination of different detection capabilities including detection capabilities in storage systems are beneficial.

As the importance of computer systems and networks continue to increase, cybersecurity attacks pose an increasingly significant threat. Cybersecurity has thereby become a significant challenge due to the complexity of computer systems in general, as well as the broad application of computer networks. Ransomware is one such type of cybersecurity attack that has been difficult for conventional products to detect and overcome. For instance, ransomware tries to avoid detection by encrypting and rewriting only parts of a file, so to minimize the footprint of ransomware activity. This also results in the sector I/O observed by a storage device to include a mixture of the ransomware and legitimate operations, e.g., initiated by a user. While attempts have been made to prevent these attacks, conventional products have had difficulty even detecting ransomware attacks as they occur. Accordingly, there exists a need to develop an intelligent system that is able to detect ransomware activity.

In sharp contrast to these conventional shortcomings, approaches herein are able to detect ransomware activity in storage systems by carefully evaluating the different components of write requests. While different types of information may be examined in an attempt to detect ransomware attacks, e.g., such as data read/write rates, logical block address (LBA) variance for reads/writes, entropy variance, re-write rates (rate at which LBAs read are overwritten within a short amount of time), entropy slope, etc., none of these features (e.g., signals) incorporate the fact that ransomware impacts only a portion of a file. Rather, approaches herein indicate ransomware activity by extracting a degree of randomness from sectors of write requests, and comparing the extracted degrees of randomness to identify deviations among them. The identified deviations represent unnatural shifts in the outcomes of the write requests which indicate ransomware activity, e.g., as will be described in further detail below.

Looking now to FIG. 2A, a system 200 having a distributed architecture is illustrated in accordance with one approach. As an option, the present system 200 may be implemented in conjunction with features from any other approach listed herein, such as those described with reference to the other FIGS., such as FIG. 1. However, such system 200 and others presented herein may be used in various applications and/or in permutations which may or may not be specifically described in the illustrative approaches or implementations listed herein. Further, the system 200 presented herein may be used in any desired environment. Thus FIG. 2A (and the other FIGS.) may be deemed to include any possible permutation.

As shown, the system 200 includes a central data storage location 202 that is connected to a user device 204, and edge node 206 accessible to the user 205 and administrator 207, respectively. The user device 204 and/or edge node 206 may thereby be considered "host locations" that are in communication with the central data storage location 202. The central data storage location 202, user device 204, and edge node 206 are each connected to a network 210, and may thereby be positioned in different geographical locations, in the same data center, or even in the same physical computing system. The network 210 may be of any type, e.g., depending on the desired approach. For instance, in some approaches the network 210 is a WAN, e.g., such as the Internet. However, an illustrative list of other network types which network 210 may implement includes, but is not limited to, a LAN, a PSTN, a SAN, direct attached storage, an internal telephone network, etc. As a result, any desired information, data, commands, instructions, responses, requests, etc. may be sent between user device 204, edge node 206, and/or central data storage location 202, regardless of the amount of separation which exists therebetween, e.g., despite being positioned at different geographical locations. According to some approaches, the central data storage location 202 is a remote cloud server that is connected to (e.g., may be accessed by) user device 204 and/or edge node 206.

However, it should be noted that two or more of the user device 204, edge node 206, and central data storage location 202 may be connected differently depending on the approach. According to an example, which is in no way intended to limit the invention, two servers (e.g., nodes) may be located relatively close to each other and connected by a wired connection, e.g., a cable, a fiber-optic link, a wire, etc.; etc., or any other type of connection which would be apparent to one skilled in the art after reading the present description.

The terms "user," "host," and "administrator" are in no way intended to be limiting either. For instance, while users, hosts, and/or administrators may be described as being individuals in various implementations herein, a user, host, and/or administrator may be an application, an organization, a preset process, etc. The use of "data" and "information" herein are in no way intended to be limiting either, and may include any desired type of details, e.g., depending on the type of operating system implemented on the user device 204, edge node 206, and/or central data storage location 202. In some approaches, host write requests are received at the central data storage location 202 from a host (e.g., user 205 and/or administrator 207) at the user device 204 and/or the edge node 206, respectively. Accordingly, data may be written to memory at the central data storage location 202 in response to receiving host write requests. In some approaches, host write requests received at the central data storage location 202 include read-verify-write operations. Accordingly, data may be read from and/or written to memory at the central data storage location 202 in response to receiving host write requests, e.g., as will be described in further detail below.

With continued reference to FIG. 2A, the central data storage location 202 includes a large (e.g., robust) processor 212 coupled to a cache 211, an AI module 213, and a data storage array 214 having a relatively high storage capacity. The data storage array 214 may include any desired type of data storage components depending on the approach. Thus, while the data storage array 214 may be illustrated as including hard disk drives, this is in no way intended to be limiting. In other approaches, the array 214 may include solid state drives having volatile and/or non-volatile memory therein, magnetic tape drives, optical storage drives, etc. For instance, referring momentarily to FIG. 2B, the central data storage location 252 is shown as having a data storage module 254 including an array of storage devices 256. The array of storage devices 256 may further include non-volatile memory that is used to store data.

Referring back to FIG. 2A, the AI module 213 may include any desired number and/or type of AI-based models, e.g., such as machine learning models, deep learning models, neural networks, etc. In preferred approaches, the AI module 213 and/or processor 212 are able to train one or more machine learning models to inspect information on incoming host requests and determine whether any cyber-security related threats are present in the requests. Alternatively, machine learning models may be trained externally to the data storage location 202 and AI module 213 may only inspect information from incoming host requests by performing inference. Inference runs the collected information from incoming host requests into a machine learning model to calculate an output such as a classification score. The AI module 213 may be configured to extract a degree of randomness from each sector of a host write request, and compare the extracted degrees of randomness to each other to determine deviations among them. The AI module may collect and aggregate feature information including metrics on the degree of randomness of write requests directly from one or more storage devices in the data storage array 114 to perform inference on them. Moreover, any of the sectors in the host write request that correspond to identified deviations in the extracted degrees of randomness may be identified as including ransomware activity.

These machine learning models may also continue to be trained (e.g., retrained) using the outcome of data requests that are processed at the central data storage location 202 over time. As a result, approaches herein are able to capitalize on the fact that ransomware attacks typically impact only a portion of a file. Rather, identifying these deviations highlights unnatural shifts in the outcomes of the write requests, which often indicate ransomware activity, e.g., as will be described in further detail below (e.g., see method 300 of FIG. 3A). For example, received data requests (e.g., signals) may be used to form a feature vector for each time interval. These feature vectors may thereby be used as the input to a machine learning model (e.g., a Random Forest machine learning algorithm) to train it for detecting ransomware activity.

With continued reference to FIG. 2A, user device 204 includes a processor 216 which is coupled to memory 218. The processor 216 receives inputs from and interfaces with user 205. For instance, the user 205 may input information using one or more of: a display screen 224, keys of a computer keyboard 226, a computer mouse 228, a microphone 230, and a camera 232. The processor 216 may thereby be configured to receive inputs (e.g., text, sounds, images, motion data, etc.) from any of these components as entered by the user 205. These inputs typically correspond to information presented on the display screen 224 while the entries were received. Moreover, the inputs received from the keyboard 226 and computer mouse 228 may impact the information shown on display screen 224, data stored in memory 218, information collected from the microphone 230 and/or camera 232, status of an operating system being implemented by processor 216, etc. The electronic device 204 also includes a speaker 234 which may be used to play (e.g., project) audio signals for the user 205 to hear.

Some data (e.g., non-sensitive data) may be received from user 205 for storage and/or evaluation using AI module 213 at central data storage location 202. The data may be received as a result of the user 205 using one or more applications, software programs, temporary communication connections, etc. running on the user device 204. For example, the user 205 may upload data for storage at the data storage array 214 and evaluation using processor 212 and/or AI module 213 of central data storage location 202. As a result, the data is evaluated and processed.

Looking now to the edge node 206, some of the components included therein may be the same or similar to those included in user device 204, some of which have been given corresponding numbering. For instance, controller 217 is coupled to memory 218, a display screen 224, keys of a computer keyboard 226, and a computer mouse 228. Additionally, the controller 217 is coupled to an AI module 238. In some approaches, the edge node 206 is a server that may be running any desired type of application (e.g., database, web-server, etc.) which results in I/O requests being sent to the storage system. However, this is in no way intended to be limiting and the edge node 206 may implement any desired type of server architecture that is able to run applications and/or middleware that directly triggers the generation of I/O requests.

As described above with respect to AI module 213, the AI module 238 may include any desired number and/or type of AI-based models. It follows that AI module 238 may implement similar, the same, or different characteristics as AI module 213 in central data storage location 202. In some approaches, AI module 238 is configured to detect deviations in the degree of randomness across sectors of host write requests. As noted above, these deviations are indicative of ransomware activity, and allow for appropriate corrective actions to be taken before the system is negatively affected.

Figure 2B:
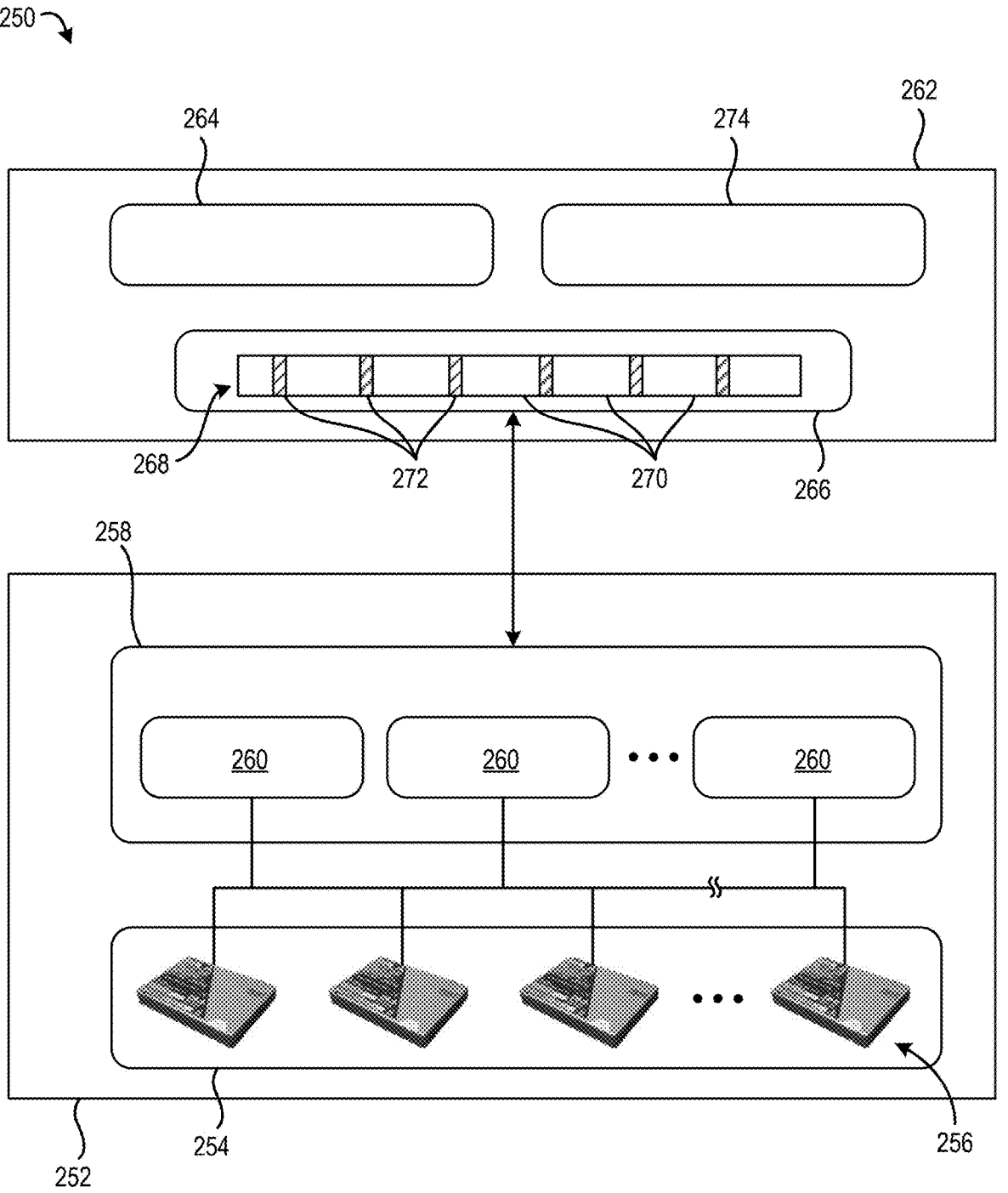
FIG. 2B is a representational view of a distributed system having ransomware detection capabilities, in accordance with one approach.

Referring momentarily now to FIG. 2B, a representational view of how ransomware activity is detected in a storage system 250 is illustrated in accordance with one approach. As an option, the present storage system 250 may be implemented in conjunction with features from any other approach listed herein, such as those described with reference to the other FIGS., e.g., such as FIGS. 1-2A. However, such storage system 250 and others presented herein may be used in various applications and/or in permutations which may or may not be specifically described in the illustrative approaches or implementations listed herein. Further, the storage system 250 presented herein may be used in any desired environment. Thus FIG. 2B (and the other FIGS.) may be deemed to include any possible permutation.

As mentioned above, the storage system 250 includes a central data storage location 252 that is connected to (e.g., in communication with) a user machine 262 (e.g., host location). The user machine 262 includes user applications 264 that are running on an operating system implemented by the user machine 262. As the user applications 264 run, they create files in the file system 266. For instance, file 268 is shown as being present in the file system 266. While a majority of the file 268 includes valid data 270, specific sectors 272 of the file have been impacted by ransomware activity. In other words, specific sectors 272 of the file have been encrypted by ransomware software 274 that has infected the user machine 262. As noted above, the ransomware tries to avoid detection by encrypting and rewriting only parts of a file, so to minimize the footprint of ransomware activity. This also results in the sector I/O observed by a storage device to include a mixture of the ransomware and legitimate data operations. In some situations, ransomware may cause the modified encrypted data parts to be written while the storage system is reading neighboring sectors of the data parts being written as a result of read-modify-write operations.

Again, approaches herein are able to capitalize on this distinct characteristic of ransomware activity by detecting deviations in the degrees of randomness across a host write request, e.g., as will be described in further detail below. Thus, the ransomware activity may be detected as the file 268 is passed to the central data storage location 252 to be stored in data storage module 254. For instance, the storage controller 258 may divide a write request stemming from file 268 into a number of sectors. Each of the sectors may be passed to a block storage volume 260 of the storage controller 258 before being implemented in physical memory at the array of storage devices 256.

Now referring to FIG. 3A, a flowchart of a method 300 for detecting ransomware activity in storage systems by extracting a degree of randomness from sectors of write requests, and comparing the extracted degrees of randomness to identify deviations among them. The identified deviations represent unnatural shifts in the outcomes of the write requests which indicate ransomware activity, e.g., as will soon become apparent. The method 300 may be performed in accordance with the present invention in any of the environments depicted in FIGS. 1-2B, among others, in various approaches. For instance, one or more operations in method 300 may be performed by components in the central data storage location 202 of FIG. 2A. Moreover, more or less operations than those specifically described in FIG. 3A may be included in method 300, as would be understood by one of skill in the art upon reading the present descriptions.

Each of the steps of the method 300 may be performed by any suitable component of the operating environment using known techniques and/or techniques that would become readily apparent to one skilled in the art upon reading the present disclosure. For example, in various implementations, the method 300 may be partially or entirely performed by a controller, a processor (e.g., see processor 212 of FIG. 2A), one or more machine learning models (e.g., see machine learning module 213 of FIG. 2A), etc., or some other device having one or more processors therein. The processor, e.g., processing circuit(s), chip(s), and/or module (s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 3A, operation 302 of method 300 includes receiving a write request. In some approaches, the write request is received from a host (e.g., a user), but the write requests may be received from any type of source depending on the approach. For instance, the write request may be received from a running application, automatically in response to a predetermined condition being met, components in remote systems connected over a network, etc.

The type of write request that is received may also vary depending on the approach. For instance, the type of memory that the write request will be implemented on may impact how the write request is constructed. In some approaches, received write requests are intended for non-volatile random-access memory and may thereby be divided into sectors, sub-sectors, etc. According to an example, which is in no way intended to be limiting, a write request intended for a target location in Flash memory may be divided into a number of sectors that correspond to blocks of the Flash memory, as well as a number of sub-sectors that correspond to pages in each of the respective blocks of the Flash memory. In another non-limiting example, a write request intended for a target location in Flash memory may be divided into a number of sectors that correspond to one or more pages of the Flash memory, as well as a number of sub-sectors that correspond to chunks in each of the respective pages of the Flash memory. In yet another example, a write request may be divided into a number of sectors that correspond to one or more logical pages store in one or more physical pages of the Flash memory, as well as a number of sub-sectors that correspond to chunks in each of the respective logical pages. It follows that each of the sectors may include a same number of sub-sectors.

According to an example, which is in no way intended to be limiting, each sub-sector of a host write request may correspond to 4 kilobytes (kBs) of data, causing there to be a number of 4 kB sub-sectors for each logical 16 kB sector (e.g., page). The sectors and/or sub-sectors can be split into larger and/or smaller regions depending on the desired approach. However, it should be noted that entropy values may be extracted from data chunks that are at least 256 bytes large in order to achieve a desired level of accuracy. Thus, for situations where ransomware encrypts every other 16 bytes, the sub-sectors may be grouped into even and odd sub-sectors, and entropy is calculated on all even and all odd sub-sectors. This results in 2 entropy values for the given sector. However, the sub-sectors may be grouped differently in other approaches, such as first half vs. second half, comparing a different number of groups (e.g., 3 or 4 groups instead of even and odd), etc.

In response to receiving the write request, method 300 proceeds from operation 302 to operation 304. There, operation 304 includes inspecting the write request to determine how each of the sectors and sub-sectors of the request impact data in memory. More specifically, operation 304 includes determining a degree of randomness that the sectors and sub-sectors in the write request impact data currently stored in memory. As noted above, ransomware tries to avoid detection by encrypting and rewriting only parts of a file, so to minimize the footprint of ransomware activity. This also results in the sector I/O observed by a storage device to include a mixture of the ransomware and legitimate data operations. Approaches herein are able to capitalize on this distinct characteristic of ransomware activity by detecting deviations in the degrees of randomness across a write request.

Figure 3B:
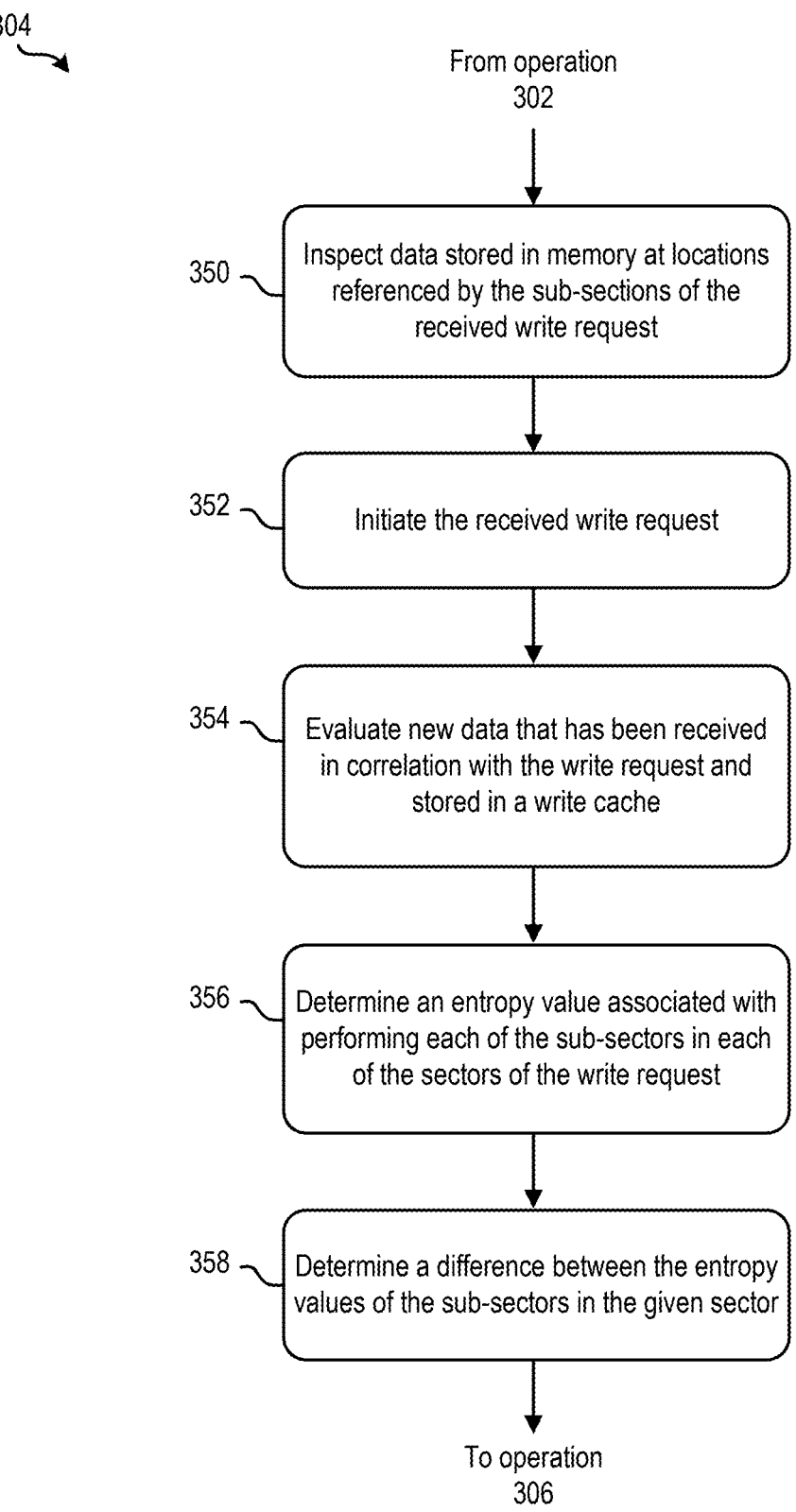
FIG. 3B is a flowchart of sub-processes for one of the operations in the method of FIG. 3A, in accordance with one approach.

For instance, FIG. 3B illustrates exemplary sub-operations of determining a degree of randomness that the sectors and sub-sectors in the write request impact data currently stored in memory, are illustrated in accordance with one approach. It follows that one or more of the sub-operations in FIG. 3B may be used to perform operation 304 of FIG. 3A for each sector of a received write request. However, it should be noted that the sub-operations of FIG. 3B are illustrated in accordance with one approach which is in no way intended to limit the invention.

For instance, sub-operations of FIG. 3B are described in the context of originally receiving a read-modify-write request that involves initially reading data before replacing the existing data with new data, which is in no way intended to be limiting. A read-modify-write request may result from a host writing at a granularity smaller than the storage system can handle. In this case, the storage system or storage device modifies a host write request into a read-modify-write operation. For example, a 4 kB write request may be translated into a 16 kB read-modify-write operation in an SSD internally. A read-modify-write operation may also be performed in a host when an application changes a subsector and the operating system first reads old data of a sector, incorporates the modified subsector in the sector, and finally write the sector back to storage. In this case, the storage system will see a read and write operation. Different types of write requests may be received and evaluated for ransomware activity, e.g., as would be appreciated by one skilled in the art after reading the present description.

Looking to FIG. 3B, sub-operation 350 includes inspecting data stored in memory at locations referenced by the sub-sectors of the received write request. In other words, sub-operation 350 includes inspecting data stored at write targets that correspond to the sub-sectors of a given sector in the received write request. The controller may additionally read the one or more adjacent sectors from memory to perform a read-modify-write operation. The data read from the specific locations in memory may be stored in a buffer or cache, e.g., such that the data may be compared against data written to the specific locations in memory as a result of performing the received write request.

Moreover, sub-operation 352 includes performing the received write request. It follows that some approaches perform the write request before fully considering the impact of performing the request. In other approaches, received write requests may be inspected before they are actually stored in persistent memory. Some approaches may thereby include temporarily storing the received write request in a queue while a remainder of method 300 is performed to determine whether the write request introduces any ransomware activity. Write requests determined as not incorporating ransomware activity may be approved and moved from the holding queue to a write buffer for implementation. However, write requests determined as including ransomware activity may trigger an alert or may be denied (e.g., rejected) before any unauthorized encryption is allowed to occur. In other embodiments, the information extracted from the write request is used as feature information to perform inference using a machine learning model.

From sub-operation 352, method 300 advances to sub-operation 354 in response to the write request being initiated. There, sub-operation 354 includes evaluating new data that has been received in correlation with the write request and stored in a write cache. In other words, new data received along with a write request may be at least temporarily stored in a write cache before potentially being written to static memory (e.g., NAND flash memory). Sub-operation 354 thereby evaluates the impact that performing the write request will have on the original (e.g., existing) data at the target locations without actually performing the write request. This gives an accurate assessment of the impact performing the various sub-sectors of the read-modify-write request will have on the data stored in memory. However, the impact of the write request may be evaluated at different points. For instance, some approaches include performing the write request, causing data to be written from a write buffer to static memory, before evaluating the impact of performing the write request.

With continued reference to FIG. 3B, sub-operation 356 includes determining an entropy value associated with performing each of the sub-sectors in each of the sectors of the write request. The entropy values may be positively correlated with the number of changes that are projected to be made to data at the write target locations in static memory (e.g., NAND flash memory) as a result of performing the respective sub-sector of the write request, without actually performing the write request. In some approaches, the entropy values are positively correlated with the complexity of performing the respective sub-sector of the write request. For example, a sub-sector of the write request that causes a large amount of host data to be written may be assigned an entropy value that is higher than the entropy value assigned to another sub-sector of the write request that does not cause any host data to be written.

According to an example, which again is in no way intended to be limiting, each sub-sector of a host write request may correspond to 4 kilobytes (kBs) of data. Thus, there are a number of 4 kB sub-sectors for each logical 16 kB sector (e.g., page). Entropy values may be determined for each 4 kB sub-sector of the data by first establishing an array of 256 bins, such that each symbol which represents a character of 8 bytes may be indexed into the array of 256 bins based on their respective value. Thus, if the first character of a 4 KB sub-sector of the host write request is "1," a count of a first of the 256 bins will be incremented. If the subsequent character of the 4 kB sub-sector of the host write request is "10," the count of the tenth bin will be incremented in a similar fashion. It follows that at the end of inspecting each 4 kBs of data, the 256 bins will effectively include a histogram of the distribution of symbols for the respective sub-sector that was evaluated. A similar histogram may be made for each of the remaining 4 kB sub-sectors that are in the same 16 kB sector of the host write request being evaluated. Comparing these histograms thereby provides insight into how the data is being changed as a result of performing each sub-sector of the host write request.

The values (e.g., counts of symbol occurrences) that are captured in each bin of the histograms may be normalized to the total number of occurrences that were experienced from the 4 kB sub-sector. This normalization will give the probability of symbol occurrence corresponding to each bin. These probabilities may further be combined in a number of different ways depending on the approach. For instance, the normalized probability at each bin in the histogram may be combined to form a Shannon entropy value, a Chi-Square value, a Monte-Carlo value, a Pi value, etc., or any other representational value which would be apparent to one skilled in the art after reading the present description. The combined probability value may thereby be used to derive (e.g., determine) the entropy value reflecting the degree of randomness that is ultimately assigned to the 4 kB sub-sector that produced the entropy value.

It follows that sub-operation 356 may include comparing the original data read in sub-operation 350 with the new data received in sub-operation 354. In some approaches, other information known about the sectors and sub-sectors in the write request may also be used to extract the entropy values. For example, previous data heat values, compressibility, predetermined locations in memory (e.g., storing honeypot files), user preferences, etc., may be factored into the entropy value reflecting the degree of randomness that is extracted for each sub-sector in each of the sectors of the write request.

With continued reference to FIG. 3B, sub-operation 358 includes determining a difference between the entropy values of the sub-sectors in the given sector. In other words, sub-operation 358 compares the entropy values determined for each of the sub-sectors in a same sector of the write request. The amount by which the entropy values change and the frequency at which the entropy values change impact the degree of randomness experienced across the sub-sectors of a sector in the write request.

Determining the difference between the entropy values of the sub-sectors in a given sector involves combining the values. According to some approaches, a median absolute deviation (MAD) value is calculated by combining the entropy values of the sub-sectors in the given sector. In other words, the entropy values for each sub-sector in a sector may be combined into a MAD value. This provides a variance across the sectors which the inventors found to be a strong indication for detecting ransomware activity. Thus, by aggregating the MAD values over a time interval, ransomware activity may be more easily detected by identifying sudden changes in activity. In some approaches, the MAD values are aggregated over a time interval into a histogram. The time interval may be predetermined by a user, set based on system performance, identified by an output generated by one or more machine learning models, etc. In other approaches, the entropy values of the sub-sectors in each sector may be combined by calculating the difference between the values, the variance across the values, standard deviations across the values, etc. Moreover, the combined entropy values for a sector may thereby represent the "degree of randomness" across the given sector, e.g., as would be appreciated by one skilled in the art after reading the present description.

It follows that by repeating the sub-operations of FIG. 3B for each sector of a write request, the degree of randomness can be determined across the sub-sectors of each sector in the write request. Returning now to FIG. 3A, method 300 advances from operation 304 to operation 306 in response to determining a degree of randomness across the sub-sectors of each respective sector in the write request. There, operation 306 includes comparing the degrees of randomness and determining whether any deviations exist therein. In other words, the degree of randomness for each sector are compared to each other to determine whether any deviations are present. As noted above, ransomware tries to avoid detection by encrypting and rewriting only parts of a file, so to minimize the footprint of ransomware activity. This also results in the sector I/O observed by a storage device deviating at times due to the mixture of ransomware activity and legitimate data operations. Thus, by identifying deviations in the degrees of randomness determined for the sub-sectors of the sectors, unwanted ransomware activity may be easily detected.

As alluded to above "sectors" are preferably larger than "sub-sectors," but the "sectors" and "sub-sectors" themselves may be of different sizes depending on the approach. According to an example, which is in no way intended to be limiting, each sub-sector of a host write request may correspond to 4 kilobytes (kBs) of data, causing there to be a number of 4 kB sub-sectors for each logical 16 kB sector (e.g., page). However, it should be noted that meaningful entropy values may be extracted from data chunks that are at least 256 bytes large in order to achieve a desired level of accuracy.

Hence, in another example where ransomware encrypts every other 16 bytes, the sub-sector size may be set to 16 bytes only and the sub-sectors may be grouped into even and odd sub-sectors, and entropy is calculated on all even and all odd sub-sectors for the identification of deviations in the degree of randomness. It follows that determining the degree of randomness across the sub-sectors of a sector includes determining multiple different degrees of randomness, where each degree of randomness is determined using a different combination of sub-sector sizes and/or groupings of sub-sectors in the given sector. It further follows that determining whether any deviations exist in the degrees of randomness is based at least in part on the number of degrees of randomness that are determined.

However, the sub-sectors may be grouped differently in other approaches, such as first half vs. second half, comparing a different number of groups (e.g., 3 or 4 groups instead of even and odd), etc. If follows that more than a single type of entropy value and hence types of degrees of randomness may be extracted from sub-sectors or sectors that can be used to detect ransomware activity. Also, different types of degrees of randomness values extracted may use different sub-sector sizes and groupings. Overall, a deviation in the degrees of randomness may be determined based on detecting a deviation in one, a subset, or all types of degrees of randomness determined herein as would be appreciated by one skilled in the art after reading the present description.

It should be noted that with respect to the present description, a "deviation" in the degrees of randomness determined for each sector is intended to refer to a sufficient change in the entropy values of the sub-sectors in the respective sectors. The combination (e.g., MAD value) of the entropy values from adjacent sub-sectors in the same sector are preferably compared to the combined entropy values from other sectors to identify deviations. For example, in some approaches a "deviation" may be any change in the degrees of randomness between adjacent sectors that is greater than 1%, 2%, 3%, 4%, 5%, 10%, 15%, 20%, 30%, 40%, 50%, 60%, etc. In other approaches, a deviation may be any change in the degrees of randomness that are experienced across all of the sectors in write request. For example, a "deviation" may be identified in response to determining that a sector has a degree of randomness that is at least two times greater than any other sector in the same write request.

Method 300 thereby proceeds from operation 306 to operation 308 in response to determining that one or more deviations exist in the degrees of randomness. There, operation 308 includes using information associated with the one or more deviations as an indicator of the host write request including ransomware activity. It follows that the host write request received in operation 302 may be identified as including ransomware activity in situations where the information associated with the one or more deviations (the "indicator(s)") indicates a strong indication that ransomware activity is present. In some approaches, the specific sectors in the host write request that correspond to the deviations identified in operation 306 may be identified. This may allow a user to pinpoint the source of ransomware activity, make a focused attempt to remove a source of the ransomware activity, etc. In some approaches, a warning that summarizes the ransomware activity may be returned to a host that originally issued the write request, a storage system dashboard, or a cybersecurity surveillance system. In other approaches, results may be stored in memory and/or used to retrain one or more machine learning models. For instance, one or more machine learning models may be trained to extract an entropy value from each sub-sector of a host write request and combine the entropy values to determine a degree of randomness for the whole sector. The extracted degrees of randomness from adjacent sectors may thereby be compared to each other to determine deviations among them.

Returning momentarily to operation 306, method 300 alternatively proceeds to operation 310 in response to determining that deviations are not detected. There, operation 310 includes approving the host write request by verifying the data that has been written to memory as a result of performing the host write request.

It follows that method 300 is able to leverage the fact that storage devices 256 processes I/O operations internally in 16 kB granularity. Method 300 is also able to leverage that file systems typically layout data belonging to the same file contiguously in the LBA address space. Hence, it can be assumed that within a 16 kB logical page or a physical Flash page), data belonging to the same file is likely adjacent. Therefore, when only a subset of data (e.g., 4 kB) is encrypted by the ransomware, the degree of randomness of the other 4 kB sectors in the logical page will not change and typically be lower than the encrypted one. Thus, a degree of randomness may be extracted from a host write request and neighboring sectors (e.g., 4 kB sectors for each logical 16 kB page); on sub-sectors of each sector; etc., or any meaningful split of the original memory. The extracted degrees of randomness may thereby be compared by, for example, calculating the difference, the variance, the MAD, etc., as described herein.

Figure 4A:
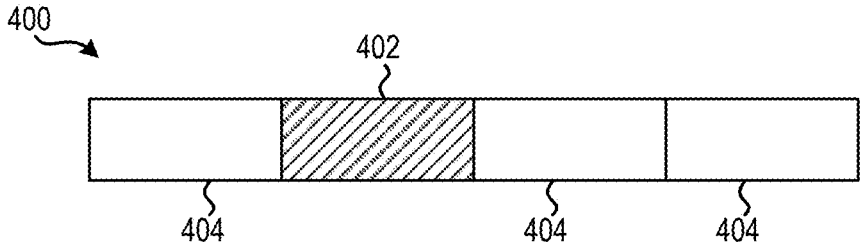
FIG. 4A is a representational view of performing a small host write request in accordance with an in-use example.

According to another example, some small write requests may internally result in a read-modify-write operation being performed in a storage device. In these situations, adjacent sub-sectors may be read, resulting in more data being read than will actually be modified by the host request. For instance, FIG. 4A illustrates how a small host write request is performed in accordance with an in-use example which is in no way intended to be limiting. A write request that ultimately impacts less than a full sector (i.e., only some of the sub-sectors in a sector are written to) may be considered "small." Thus, a small write request received may correspond to one 4 kB sub-sector 402 of a full 16 KB sector 400, while the remaining 4 kB sub-sectors 404 will not be modified by the small write request. Rather than only read the 4 kB sub-sector 402 that will be impacted (written to) as a result of actually performing the received write request, the full 16 kB sector 400 may be read. Again, additional data (e.g., additional neighboring sub-sectors and/or data correlated with the small write request in other sectors/sub-sectors) not provided by the write request may be read in addition to the data that is being modified by the small write requests. Thus, in some approaches degree of randomness values may be extracted in a hierarchical fashion from sectors and sub-sectors as a result of evaluating the existing data.

Figure 4B:
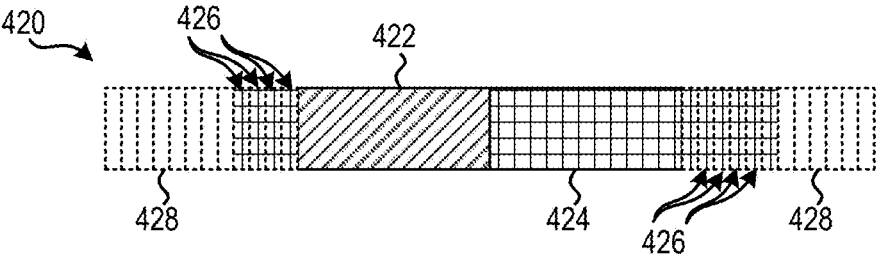
FIG. 4B is a representational view of performing a small host write request in accordance with an in-use example.

Similarly, looking to FIG. 4B, another in-use example of how sectors or even sub-sectors can be split into progressively smaller regions is shown, which is in no way intended to be limiting. As shown, a small write request that only impacts a single 4 kB sub-section 422 of a 16 kB section 420 may be received. Again, rather than only read the 4 kB sub-sector 422 that will be impacted (written to) as a result of performing the received write request, a full additional sub-sector 424, along with a number of sub-sub-sectors 426 from the respective overarching sub-sectors 428 that were not referenced in the small write request, may also be selectively read. As noted above, additional data (e.g., additional neighboring sub-sectors and/or sub-sub-sectors) not provided by the write request may be read in addition to the data that is being modified by the small write requests. Degree of randomness values may thereby be extracted in a hierarchical fashion from sectors, sub-sectors, sub-sub sectors, etc.

Figure 4C:
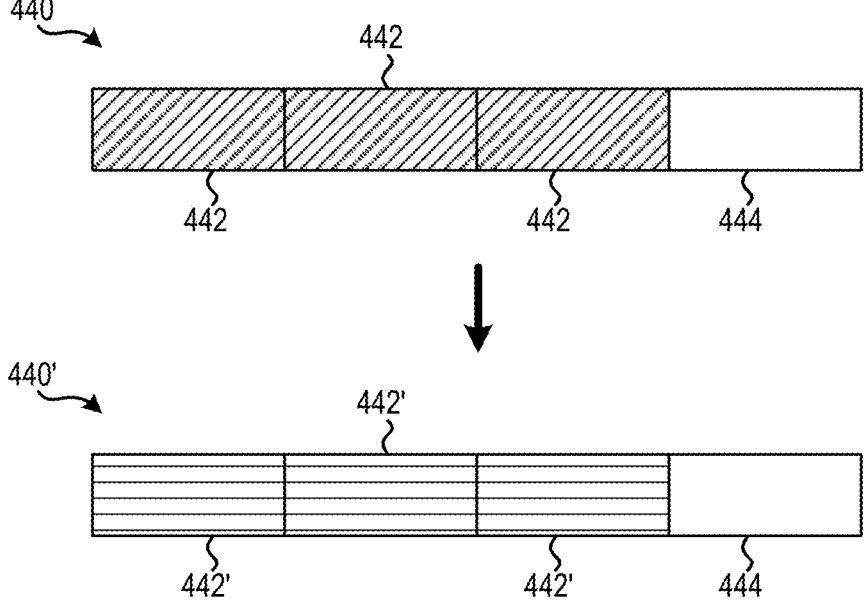
FIG. 4C is a representational view of performing a small host write request in accordance with an in-use example.

According to still another in-use example, which is again in no way intended to be limiting, FIG. 4C illustrates how existing data may be compared to newly written data to determine a degree of randomness or a degree of change in randomness. As shown, a small write request that impacts three 4 KB sub-sections 442 of a 16 kB section 440, but not sub-section 444, may be received. The existing data stored in the 4 kB sub-sections 442 prior to performing the write request may thereby be examined (e.g., read) and stored. The updated 16 kB section 440' preferably represents the impact that performing the write request will have on data stored at the target sub-sections. In other words, the updated 16 kB section 440' may simply be determined by examining a write buffer and determining the new data to be written. It follows that a degree of randomness may be determined from the existing (e.g., original) data in the 4 kB sub-sections 442 prior to performing the write request, and a degree of randomness may be determined from the new data that is (or will be) in the 4 kB sub-sections 442' after performing the write request, and the two degrees of randomness may be compared by for example calculating the difference of them to form a new metric for a degree of randomness. Clearly, this new metric can be further used to compute a MAD value of the respective entropy values or histogram of MAD values, etc. as has been explained in details above. Depending on the approach, the approaches described in association with FIGS. 4A-4C may be combined in any desired fashion.

Moreover, in some approaches I/O operations are supported by internally performing read-modify-write operations. The read-modify-write operation can also be performed in a higher level of the storage system stack or host operating system. Approaches herein are thereby capable of achieving strong signal information irrespective of where the read-modify-write takes place. This is also still applicable for storage devices that see only modified sectors writes. In such situations, reading adjacent LBA sectors is performed at least for some of the writes. This could for example be combined with existing sequential prefetching algorithms, e.g., as would be appreciated by one skilled in the art after reading the present description.

Ransomware detection may further be improved in some approaches by implementing honeypot files and other types of data in memory that should not be modified as a result of performing received write requests. In other words, by using large existing files and/or honeypot files that are placed into volumes for which the corresponding logical LBA addresses are known, any modifications that are attempted at the known LBA addresses can automatically be detected as being unauthorized. It follows that one or more processes may be running in the background to detect any such unauthorized modifications as host write requests are received and satisfied. For example, a honeypot file checker may monitor data being written to memory and determine whether any of the target addresses include LBAs that are known to be storing at least a portion of a known honeypot file. In response to determining that one or more of the target addresses include LBAs that are known to be storing at least a portion of the known honeypot file, the given sector of the host write request that resulted in the unauthorized modification of the honeypot file may thereby be flagged as including ransomware activity.

Again, approaches herein are able to compute and use a measure of data-randomness (e.g., such as entropy) difference across a number of neighboring sectors (e.g., blocks) or sub-sectors (e.g., block parts, or pages). Moreover, this is performed for each data I/O request that is received, or on the majority of I/O request received, or on any sampled number of I/O requests received. For instance, data-randomness across the sub-sectors of each sector may be computed as MAD value of the respective entropy values. However, other measures may be used to perform similar determinations, e.g., such as variance, kurtosis, etc., across the sub-sectors, e.g., as would be appreciated by one skilled in the art after reading the present description.

It will be clear that the various features of the foregoing systems and/or methodologies may be combined in any way, creating a plurality of combinations from the descriptions presented above.

It will be further appreciated that implementations of the present invention may be provided in the form of a service deployed on behalf of a customer to offer service on demand.

The descriptions of the various implementations of the present invention have been presented for purposes of illustration, but are not intended to be exhaustive or limited to the implementations disclosed. Many modifications and variations will be apparent to those of ordinary skill in the art without departing from the scope and spirit of the described implementations. The terminology used herein was chosen to best explain the principles of the implementations, the practical application or technical improvement over technologies found in the marketplace, or to enable others of ordinary skill in the art to understand the implementations disclosed herein.

What is claimed is:

1. A computer-implemented method (CIM) for detecting ransomware activity in storage systems, comprising:

receiving a write request having a plurality of sectors, wherein each of the sectors includes a number of sub-sectors;

causing the sub-sectors in the respective sectors of the write request to be performed;

determining degrees of randomness across the sub-sectors of the respective sectors by:

determining entropy values associated with the performing the sub-sectors in the respective sectors of the write request, and determining a difference between the entropy values of the sub-sectors in the respective sectors;

determining whether any deviations exist in the degrees of randomness; and in response to determining a deviation exists in the degrees of randomness, using information associated with the deviation to determine that one or more of the sub-sectors in one or more of the respective sectors includes data encrypted by ransomware.

2. The CIM of claim 1, wherein the determining of the difference between the entropy values of the sub-sectors in the respective sectors includes:

calculating a median absolute deviation (MAD) value for the entropy values of the sub-sectors.

3. The CIM of claim 2, further comprising:

aggregating MAD values calculated for write requests over a time interval, wherein the MAD values are aggregated in a histogram.

4. The CIM of claim 1, wherein the determining of the entropy values associated with performing the sub-sectors in the respective sectors includes:

calculating a first value, the first value being selected from the group consisting of: a Shannon entropy value, a Chi-Square value, a Monte-Carlo value, and a Pi value; and using the first value to derive the entropy value.

5. The CIM of claim 1, wherein the write request includes a read-modify-write operation, wherein the determining of the degrees of randomness across the sub-sectors includes, for the respective sectors:

reading original data stored in memory at target addresses that correspond to the sub-sectors of a given sector of the write request;

in response to the write request being initiated, evaluating new data in a write cache;

determining entropy values associated with performing the respective sub-sectors in the given sector by comparing the original data and the new data; and determining a difference between the entropy values of the sub-sectors in the given sector.

6. The CIM of claim 5, further comprising:

determining whether any of the target addresses include at least a portion of a known honeypot file; and in response to determining that one or more of the target addresses include at least a portion of the known honeypot file, identifying the given sector of the write request as including ransomware activity.

7. The CIM of claim 1, further comprising:

receiving a second write request which impacts less than a full sector, the second write request having a first set of sub-sectors in an identified sector; and determining a second set of sub-sectors in the identified sector not being part of the second write request;

reading original data stored in memory at target addresses that correspond to the first and second sets of sub-sectors;

determining a degree of randomness across the first set of sub-sectors in the identified sector; and determining a degree of randomness across the second set of sub-sectors in the identified sector.

8. The CIM of claim 1, wherein the determining of the degrees of randomness across the sub-sectors of the respective sectors includes, determining a number of degrees of randomness across the sub-sectors of a given one of the respective sectors, wherein each degree of randomness is determined using a different combination of sub-sector sizes and/or groupings of sub-sectors of the given sector, wherein the determining of whether any deviations exist in the degrees of randomness is based at least in part on the number of degrees of randomness that are determined.

9. A computer program product (CPP) for detecting ransomware activity in storage systems, comprising:

a set of one or more computer-readable storage media; and program instructions, collectively stored in the set of one or more storage media, for causing a processor set to perform the following computer operations:

receive a write request having a plurality of sectors, wherein each of the sectors includes a number of sub-sectors;

cause the sub-sectors in the respective sectors of the write request to be performed;

determine degrees of randomness across the sub-sectors of the respective sectors by:

determining entropy values associated with the performing the sub-sectors in the respective sectors of the write request, and determining a difference between the entropy values of the sub-sectors in the respective sectors;

determine whether any deviations exist in the degrees of randomness; and in response to determining a deviation exists in the degrees of randomness, using information associated with the deviation to determine that one or more of the sub-sectors in one or more of the respective sectors includes data encrypted by ransomware.

10. The CPP of claim 9, wherein the determining of the difference between the entropy values of the sub-sectors in the respective sectors includes:

calculating a median absolute deviation (MAD) value for the entropy values of the sub-sectors.

11. The CPP of claim 10, wherein the program instructions are for causing the processor set to further perform the following computer operations:

aggregate MAD values calculated for write requests over a time interval, wherein the MAD values are aggregated in a histogram.

12. The CPP of claim 9, wherein the determining of the entropy values associated with performing the sub-sectors in the respective sectors includes:

calculating a first value, the first value being selected from the group consisting of: a Shannon entropy value, a Chi-Square value, a Monte-Carlo value, and a Pi value; and using the first value to derive the entropy value.

13. The CPP of claim 9, wherein the write request includes a read-modify-write operation, wherein the determining of the degrees of randomness across the sub-sectors includes, for the respective sectors:

reading original data stored in memory at target addresses that correspond to the sub-sectors of a given sector of the write request;

in response to the write request being initiated, evaluating new data in a write cache;

determining entropy values associated with performing the respective sub-sectors in the given sector by comparing the original data and the new data; and determining a difference between the entropy values of the sub-sectors in the given sector.

14. The CPP of claim 13, wherein the program instructions are for causing the processor set to further perform the following computer operations:

determine whether any of the target addresses include at least a portion of a known honeypot file; and in response to determining that one or more of the target addresses include at least a portion of the known honeypot file, identify the given sector of the write request as including ransomware activity.

15. The CPP of claim 9, wherein the program instructions are for causing the processor set to further perform the following computer operations:

receive a second write request which impacts less than a full sector, the second write request having a first set of sub-sectors in an identified sector; and determine a second set of sub-sectors in the identified sector not being part of the second write request;

read original data stored in memory at target addresses that correspond to the first and second sets of sub-sectors;

determine a degree of randomness across the first set of sub-sectors in the identified sector; and determine a degree of randomness across the second set of sub-sectors in the identified sector.

16. A computer system (CS), comprising:

a processor set;

a set of one or more computer-readable storage media;

program instructions, collectively stored in the set of one or more storage media, for causing the processor set to perform the following computer operations:

receive a write request having a plurality of sectors, wherein each of the sectors includes a number of sub-sectors;

cause the sub-sectors in the respective sectors of the write request to be performed;

determine degrees of randomness across the sub-sectors of the respective sectors by:

determining entropy values associated with the performing the sub-sectors in the respective sectors of the write request, and determining a difference between the entropy values of the sub-sectors in the respective sectors;

determine whether any deviations exist in the degrees of randomness; and in response to determining a deviation exists in the degrees of randomness, using information associated with the deviation to determine that one or more of the sub-sectors in one or more of the respective sectors includes data encrypted by ransomware.

17. The CS of claim 16, wherein the write request includes a read-modify-write operation, wherein the determining of the degrees of randomness across the sub-sectors includes, for the respective sectors:

reading original data stored in memory at target addresses that correspond to the sub-sectors of a given sector of the write request;

in response to the write request being initiated, evaluating new data in a write cache;

determining entropy values associated with performing the respective sub-sectors in the given sector by comparing the original data and the new data; and determining a difference between the entropy values of the sub-sectors in the given sector.

* * * * *